(12) United States Patent
Garino et al.

(10) Patent No.: US 9,694,258 B2
(45) Date of Patent: Jul. 4, 2017

(54) GOLF-CLUB HEAD COMPRISED OF LOW-FRICTION MATERIALS, AND METHOD OF MAKING SAME

(71) Applicant: RGP Innovations, LLC, Malvern, PA (US)

(72) Inventors: Jonathan P. Garino, Villanova, PA (US); Robert A. Ruggiero, Sr., West Chester, PA (US)

(73) Assignee: RGP INNOVATIONS, LLC, Malvern, PA (US)

( * ) Notice: Subject to any disclaimer, the term of this patent is extended or adjusted under 35 U.S.C. 154(b) by 0 days.

(21) Appl. No.: 15/243,463

(22) Filed: Aug. 22, 2016

(65) Prior Publication Data

US 2016/0375319 A1    Dec. 29, 2016

Related U.S. Application Data

(63) Continuation-in-part of application No. 14/679,335, filed on Apr. 6, 2015, now Pat. No. 9,422,198, and a
(Continued)

(51) Int. Cl.
*C22C 16/00* (2006.01)
*A63B 53/04* (2015.01)
(Continued)

(52) U.S. Cl.
CPC ............ *A63B 53/047* (2013.01); *A63B 53/00* (2013.01); *A63B 53/04* (2013.01);
(Continued)

(58) Field of Classification Search
CPC .............................. C22C 16/00; C22C 1/0458
See application file for complete search history.

(56) References Cited

U.S. PATENT DOCUMENTS

| 4,000,013 A | * | 12/1976 | MacEwen | ............... | C22F 1/186 |
| | | | | | 148/672 |
| 4,226,647 A | * | 10/1980 | Schulson | ............... | C22C 16/00 |
| | | | | | 148/421 |

(Continued)

OTHER PUBLICATIONS

Yang et al. Optical properties of titanium oxynitride nanocrystals synthesized via a thermal liquid-solid metathesis reaction. Chemical Physics Letters 383 (2004) 502-506.*

*Primary Examiner* — Noah Wiese
(74) *Attorney, Agent, or Firm* — Axenfeld Law Group, LLC; Robert R. Axenfeld

(57) ABSTRACT

Described is a golf club with an outer surface comprising a low-friction ceramic material with suitable thickness and configuration. In one aspect, at least the striking surface and/or sole of a golf-club head is made of a low-friction material including at least one of: titanium nitride, titanium carbonitride, titanium oxynitride, titanium carbide, titanium aluminum nitride, aluminum titanium nitride, titanium silicon nitride, titanium niobium nitride, titanium zirconium nitride, silicon nitride, aluminum oxide, zirconium oxide, silicon oxide, zirconium nitride, chromium nitride, chromium carbonitride, chromium aluminum nitride, aluminum chromium nitride, titanium aluminum silicon nitride, and one or more combinations thereof.

2 Claims, 2 Drawing Sheets

Related U.S. Application Data continuation-in-part of application No. 15/224,602, filed on Jul. 31, 2016.

(60) Provisional application No. 62/358,140, filed on Jul. 4, 2016.

(51) Int. Cl.
| | |
|---|---|
| *A63B 53/00* | (2015.01) |
| *B64C 11/16* | (2006.01) |
| *B64C 27/32* | (2006.01) |
| *C23C 8/10* | (2006.01) |
| *H04M 1/02* | (2006.01) |

(52) U.S. Cl.
CPC .......... *A63B 53/0466* (2013.01); *B64C 11/16* (2013.01); *B64C 27/32* (2013.01); *C22C 16/00* (2013.01); *C23C 8/10* (2013.01); *A63B 2053/0412* (2013.01); *A63B 2053/0425* (2013.01); *A63B 2209/00* (2013.01); *H04M 1/0202* (2013.01)

(56) References Cited

U.S. PATENT DOCUMENTS

| | | | |
|---|---|---|---|
| 4,895,077 A * | 1/1990 | Miethlich | ............... F42B 12/06 102/501 |
| 4,957,883 A | 9/1990 | Kobayashi et al. | |
| 5,340,107 A | 8/1994 | Baker et al. | |
| 5,509,933 A * | 4/1996 | Davidson | ............... A61B 17/72 606/280 |
| 5,531,444 A * | 7/1996 | Buettner | ............... A63B 53/04 473/349 |
| 5,620,536 A * | 4/1997 | Dahlb ack | ............. C22F 1/186 148/519 |
| 6,027,010 A | 2/2000 | Shira | |
| 6,196,936 B1 | 3/2001 | Meckel | |
| 6,440,010 B1 * | 8/2002 | Deshmukh | ............. A63B 53/04 473/335 |
| 6,638,577 B2 | 10/2003 | Sano et al. | |
| 6,849,085 B2 * | 2/2005 | Marton | ................... A61F 2/91 623/1.13 |
| 7,083,525 B2 | 8/2006 | Pond et al. | |
| 7,550,209 B2 * | 6/2009 | Pawar | ................ A61F 2/30767 428/472 |
| 8,007,373 B2 | 8/2011 | Soracco et al. | |
| 8,313,585 B2 | 11/2012 | Ko et al. | |
| 2007/0137734 A1 | 6/2007 | Pawar et al. | |
| 2009/0180918 A1 | 7/2009 | Tsai et al. | |
| 2010/0015396 A1 * | 1/2010 | Johnson | ................ C04B 35/573 428/142 |
| 2010/0331167 A1 | 12/2010 | Ohta et al. | |
| 2011/0218052 A1 | 9/2011 | Hu et al. | |
| 2016/0193507 A1 | 7/2016 | Quan et al. | |

\* cited by examiner

GOLF-CLUB HEAD COMPRISED OF LOW-FRICTION MATERIALS, AND METHOD OF MAKING SAME

CROSS REFERENCE TO RELATED APPLICATIONS

This application is a continuation-in-part of U.S. patent application Ser. No. 15/224,602 filed Jul. 31, 2016, and U.S. patent application Ser. No. 14/679,335 filed Apr. 6, 2015, and claims priority to both applications. The present application also claims priority to U.S. patent application Ser. No. 62/358,140 filed Jul. 4, 2016.

BACKGROUND

Many golfers produce undesirable side spin on a golf ball when their club strikes the ball. This side spin may cause the ball to hook or slice. In other words, the side spin causes the ball to travel to the left or right instead of straight, which was the intended direction of the ball for the golfer.

Many golfers desire to minimize spin, especially when using their driver or fairway woods. Minimizing spin imparted on the golf ball helps the ball to travel in a generally straight line after it is hit, and hence, travel further in a desired direction.

Various attempts have been made to reduce spin and friction between the hitting surface of a golf-club head and the golf ball after the ball is hit. Most of these attempts have been unsuccessful due to costs, poor designs, or ill-suited materials.

SUMMARY

Described herein are golf-club heads with at least a striking surface and/or sole that includes low-friction materials, which help to minimize spin imparted on a golf ball, minimize friction between the sole of the club and grass, and improve durability of the club head.

In one aspect, at least the striking surface and/or sole of a golf-club head is made of a low-friction material including at least one of following materials: titanium nitride, titanium carbonitride, titanium oxynitride, titanium carbide, titanium aluminum nitride, aluminum titanium nitride, titanium silicon nitride, titanium niobium nitride, titanium zirconium nitride, silicon nitride, aluminum oxide, zirconium oxide, silicon oxide, zirconium nitride, chromium nitride, chromium carbonitride, chromium aluminum nitride, aluminum chromium nitride, titanium aluminum silicon nitride, and one or more combinations thereof.

In another aspect, the club includes ceramic-metallic-alloy articles comprised of ceramic Zirconium alloy materials for use in applications outside of the medical arts. For instance, in one aspect, the striking surface of the club and/or sole consists of Zirconium of about 70% unalloyed Zirconium and about 30% Niobium.

In another aspect, the striking surface of the club and/or sole consists of between about (95-98%) unalloyed Zirconium and about (2-5%) Niobium (Zr705).

Any suitable technique may be used to manufacture the club head including three-dimensional printing. For instance, for Zirconium the club head may be heated in oxygen environment at temperatures ranging between about 200° Celsius to about 880° Celsius, for a duration of between about 10 minutes to 110 minutes.

Exposing the golf head to thermal treatment in an oxygen-rich environment provides an oxidized-zirconium-alloy apparatus. One, two, or three heating cycles may be used, with a quenching cycle, such as a water or air, interposed between each heating step. The temperature and duration of heating are selected to provide a strongly adherent oxide-rich layer with increased scratch, wear and hardness resistance, and decreased friction resistance.

The surface of the club head may be polished to increase wear and impact resistance while decreasing friction resistance. Other machining, casting, or forging of the alloy into a desire shape may be achieved by any suitable methods used with the forgoing materials.

In another example, the club head includes a metallic alloy having a ceramic surface. In one example, a golf-club head (such as a driver, fairway wood, putter, irons, and the like) contains metallic alloy having a ceramic surface in different forms, such as a coating, as one or more layers of a portion of the head, encapsulated, integral, or selectively distributed at various locations of a golf-club head.

In one aspect, the ceramic surface is disposed on the face (i.e., striking surface) of the golf club. In another aspect, the ceramic surface is disposed on one or more portions of the sole of the golf club.

In another example, the shaft of a golf club or a tennis racket frame may also contain low-friction materials on the surface, and may be reinforced with other materials or intermixed as part of matrix. The shaft may also contain selectively concentrated portions or areas containing metallic alloy having a ceramic surface and other forms of low-friction materials. The material of the shaft may also be encapsulated or layered with other materials.

In another aspect, other articles may have outer surfaces having the foregoing low-friction materials for use in other applications outside golf, including but not limited to: dishware, appliances, helmets, guns, tips for bullets or armor-piercing shells, penetrator materials for an armor piercing sabot, bullet-proof vests, armor vehicles including tanks and other armor-protecting vehicles, boat hulls, ship hulls, automobile bodies, truck bodies, airplane fuselages, the surface of airplane wings, helicopter rotors, and rockets.

The inventors also believe that airplanes, vehicles, boats hulls and other applications in which the surfaces must be hardened, and exhibit reduced friction and durability will benefit from the use of the foregoing low-friction materials.

The materials disclosed herein may also be used as a casing in lieu of or in conjunction with plastics for computers, laptops, tablets, smart phones, cell phones, and the like.

This summary is provided to introduce a selection of concepts in a simplified form that are further described below. This summary is not necessarily intended to identify key features or essential features of the claimed subject matter, nor is it necessarily intended to be used as an aid in determining the scope of the claimed subject matter.

The foregoing outlines examples of this disclosure so that those skilled in the relevant art may better understand the detailed description that follows. Additional embodiments and details will be described hereinafter. Those skilled in the relevant art should appreciate that they can readily use any of these disclosed embodiments as a basis for designing or modifying other structures or functions for carrying out the invention, without departing from the spirit and scope of the invention.

Reference herein to "one embodiment", "an embodiment", "an implementation" "an example" or similar formulations herein, means that a particular feature, structure, operation, or characteristic described in connection with the embodiment, is included in at least one embodiment of the present invention. Thus, different appearances of such phrases or formulations herein do not necessarily refer to the same embodiment. Furthermore, various particular features, structures, operations, or characteristics may be combined in any suitable manner in one or more embodiments.

BRIEF DESCRIPTION OF THE DRAWINGS

The detailed description is described with reference to the accompanying figures. In the figures, the left-most digit(s) of a reference number identifies the figure in which the reference number first appears. The figures are not necessarily drawn to scale.

DETAILED DESCRIPTION

Described herein is a golf-club head having at least a striking surface and/or sole that includes low-friction materials, which may help to minimize spin imparted on a golf ball, and improve durability of the club head.

In one aspect, at least the striking surface and/or sole of a golf-club head is made of a low-friction material including at least one of the following materials: titanium nitride, titanium carbonitride, titanium oxynitride, titanium carbide, titanium aluminum nitride, aluminum titanium nitride, titanium silicon nitride, titanium niobium nitride, titanium zirconium nitride, silicon nitride, aluminum oxide, zirconium oxide, silicon oxide, zirconium nitride, chromium nitride, chromium carbonitride, chromium aluminum nitride, aluminum chromium nitride, titanium aluminum silicon nitride, and one or more combinations thereof.

In another aspect, the golf-club head consists of Zirconium of about 70% unalloyed Zirconium and about 30% Niobium. In yet another aspect, the club head consists of between about (95-98%) unalloyed Zirconium and about (2-5%) Niobium (Zr705).

In one example, a golf-club head (such as a driver, fairway wood, putter, irons, and the like) contains a low-friction material in different forms, such as a coating, as one or more layers of a portion of the head, encapsulated, integral, or selectively distributed at various locations of a golf-club head, such as the striking surface, and/or sole.

In another aspect, the golf-club head may be comprised of one or more of the foregoing low-friction materials singularly, or as a part of composite mixed with other materials such wood, metal, or plastic, and other suitable materials for use as part of the club head.

Figure 1:
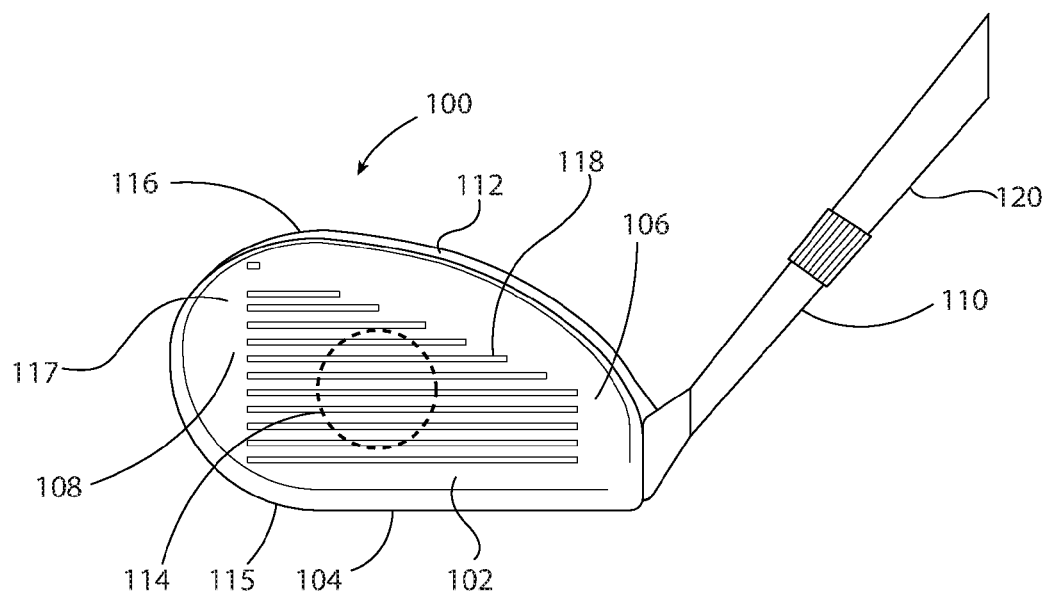
FIG. 1 is a perspective view of an example golf-club head which contains low-friction materials.

For instance, FIG. 1 is a perspective view of an example golf-club head 100 comprised of low-friction materials which contain at least one of: titanium nitride, titanium carbonitride, titanium oxynitride, titanium carbide, titanium aluminum nitride, aluminum titanium nitride, titanium silicon nitride, titanium niobium nitride, titanium zirconium nitride, silicon nitride, aluminum oxide, zirconium oxide, silicon oxide, zirconium nitride, chromium nitride, chromium carbonitride, chromium aluminum nitride, aluminum chromium nitride, titanium aluminum silicon nitride, and one or more combinations thereof.

Although the club in FIG. 1 is shown as an iron, it is appreciated by those skilled in the art that the principles described herein may apply to woods (ranging from drivers to eleven woods), or other club types such as putters, and sand or pitching wedges.

In one specific aspect, the striking surface and/or sole of the club head includes any of the aforementioned low-friction materials or Zirconium alloy materials such as Zirconium of about 70% unalloyed Zirconium and about 30% Niobium. In another aspect, the head 100 consists of between about (95-98%) unalloyed Zirconium and about (2-5%) Niobium (Zr705).

Club head 100 includes a face portion 102, a sole portion 104, a heel portion 106, a toe portion 108, a hosel portion 110, a top edge 112, a sweet-spot portion 114, a bottom edge 115, and a back portion 116. Face portion 102 forms a leading edge 117 of head 100. Conversely, back portion 116 is opposite leading edge 117, and forms the back-most portions of head 100; i.e. back portion 116 is the trailing edge.

Face portion 102 is a surface for striking a ball, and may include groves 118 or other patterns. Sole portion 104 forms a bottom of head 100. Heel portion 106 forms a rear-striking portion of head 100. Hosel portion 110 forms an interface for inserting a shaft 120 into head 100, and securing shaft 120 therein by any suitable fastening means, including adhesive and/or other fasteners.

Face portion 102 and/or sole portion 104 may be formed of ceramic low-friction materials which contain at least one of the follow materials: titanium nitride, titanium carbonitride, titanium oxynitride, titanium carbide, titanium aluminum nitride, aluminum titanium nitride, titanium silicon nitride, titanium niobium nitride, titanium zirconium nitride, silicon nitride, aluminum oxide, zirconium oxide, silicon oxide, zirconium nitride, chromium nitride, chromium carbonitride, chromium aluminum nitride, aluminum chromium nitride, titanium aluminum silicon nitride, and one or more combinations thereof.

For instance, in another aspect, a selectable area of an outer-most surface (i.e. a coating) of face portion 102 and/or sole portion 104 of a club head 100 includes a subset of the aforementioned ceramic low-friction materials. Specifically, in this example, the club head consists of one or more of the following materials: titanium oxynitride (TiON), aluminum titanium nitride, titanium zirconium nitride, chromium aluminum nitride, aluminum chromium nitride, and/or titanium aluminum silicon nitride.

In another embodiment, face portion 102 and/or sole portion 104 may also include a ceramic compound such as Zirconia, and a metal-inner core (i.e., a backing layer) such as Zirconium, and Zirconium with niobium and oxygen (ZR-2.5Nb) and may also include titanium alloys in addition to the Nb.

For instance, the unalloyed Zirconium and Niobium may form the outer surface of sweet-spot portion 114. In another example, the outer surface may extend beyond sweet-spot portion 114, such as along the entire leading edge 117 of head 100. In another example, the ceramic Zirconium-Niobium composition may extend between heel portion 106 and toe portion 108, such as approximately commensurate with an area of face portion 102 where grooves 118 are located.

In areas, where the foregoing ceramic low-friction material composition(s) do not form a portion of head 100, other suitable materials may be used, such as steel, titanium, titanium alloys, graphite, boron, steel alloys or mixtures of the foregoing.

The ceramic low-friction material compositions mentioned above may be integrally formed by forging or casting, or other suitable means. That is, the surface portions of head 100 may be integrally formed by forging or casting. In addition, the low friction compositions areas may be joined together by any suitable means such as adhesive, welding, forging, casting, three-dimensional printing, or other means.

Additional methods for manufacturing head 100 include forming the head from flat sheet of metal, super-plastic forming the head from a flat sheet of metal, machining the head from a solid block of metal, electrochemical milling the head from a forged pre-form, casting the head using centrifugal casting, casting the head using levitation casting, three-dimensional printing, and like manufacturing methods.

Alternatively, outer-surface areas of head 100 may be formed of the foregoing ceramic low-friction materials and/or ceramic-zirconium oxide containing Niobium.

In another aspect, face portion 102 and/or sole portion 104 of head 100 comprise the subset of ceramic low-friction materials—consisting of titanium oxynitride (TiON), aluminum titanium nitride, titanium zirconium nitride, chromium aluminum nitride, aluminum chromium nitride, and/or titanium aluminum silicon nitride—at the following example weights:

(a) about between 70-99 weight percent Titanium and about between 1-30 weight percent oxynitride;

(b) about between 70-99 weight percent Aluminum-Titanium and about between 1-30 weight percent Nitride.

(c) about between 70-99 weight percent Titanium and about between 1-30 weight percent zirconium nitride (e.g. about 0.10% to about between 29% percent zirconium and about between 0.10% to about 29% nitride);

(d) about between 70-99.5 weight percent aluminum, and about between 0.5-30 percent chromium and nitride (e.g. about 0.10% to about between 29% percent chromium and about between 0.10% to about 29% nitride);

(e) about between 70-99.5 weight percent titanium, and about between 0.5-30 percent chromium and nitride (e.g. about 0.10% to about between 29% percent chromium and about between 0.10% to about 29% nitride); and (f) about between 10-90 weight percent titanium, about between 10-90 weight percent Aluminum; about between 0.5% to 1% percent silicon; about between 0.1% and 1% chromium; and between 0.10% to about 1% nitride.

All weights are by percent. As appreciated by those skilled in the relevant art after having the benefit of this disclosure, the actual percentages of the aforementioned-ceramic based materials comprising a club head 100 may vary.

Figure 2:
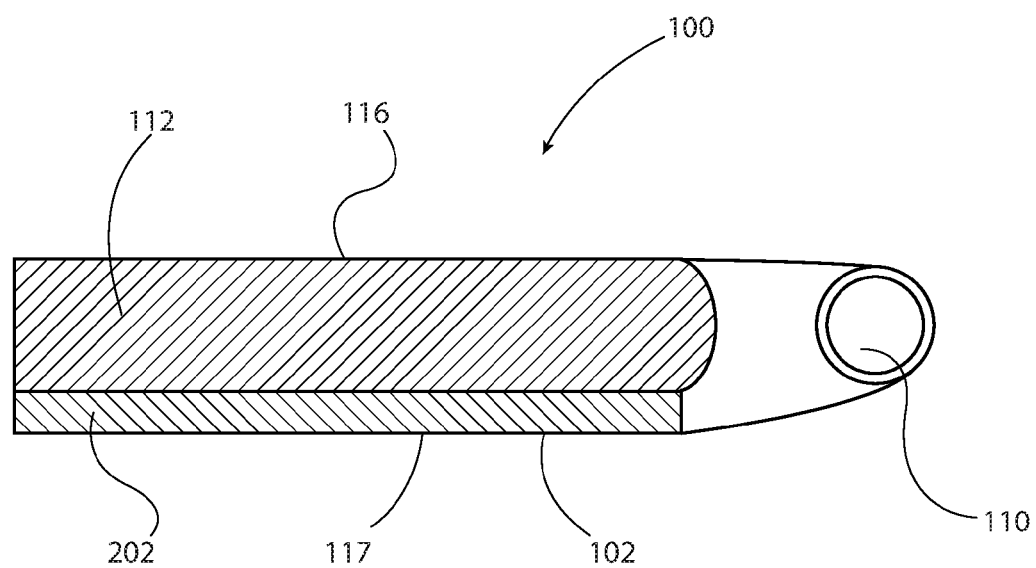
FIG. 2 is a top cross-sectional view of an example club head.

FIG. 2 is a top cross-sectional view of club head 100. As depicted in FIG. 2, leading edge 117 includes a surface layer 202 formed of the aforementioned subset of the ceramic low-friction materials consisting of titanium oxynitride (TiON), aluminum titanium nitride, titanium zirconium nitride, chromium aluminum nitride, aluminum chromium nitride, titanium aluminum silicon nitride and/or ceramic-zirconia oxide.

The thickness of surface layer 202 may vary. For example, in one implementation surface layer is about 5 μm-to-10 μm thick measured, in a perpendicular manner to leading edge 117 (i.e., measured from face to back).

In another example, surface layer 202 may have other thicknesses, greater or less than 5 μm-to-10 μm, such as between about 10 μm to about 1 cm. For instance, a thickness of surface layer 202 may range from about 0.1 mm to about 1.0 mm. In another example, the thickness of layer 202 is about 0.2 mm to about 0.8 mm. In yet another example, the thickness of layer 202 is about 0.4 mm to about 0.6 mm. And in still another example, the thickness of layer 202 is about 0.5 mm.

According to another aspect, surface layer 202 may include a hardness in Brinell scale (HB or BHN) of about 100 or more, 103 or more, 105 or more, 108 or more, 110 or more, 113 or more, 115 or more, 118 or more, or 120 or more. Alternatively, surface layer 202 may include a hardness in Brinell scale of about 90, no more than 88, no more than 85, no more than 83, no more than 80, no more than 78, no more than 75, no more than 73, no more than 70, no more than 68, and/or no more than 65.

Figure 3:
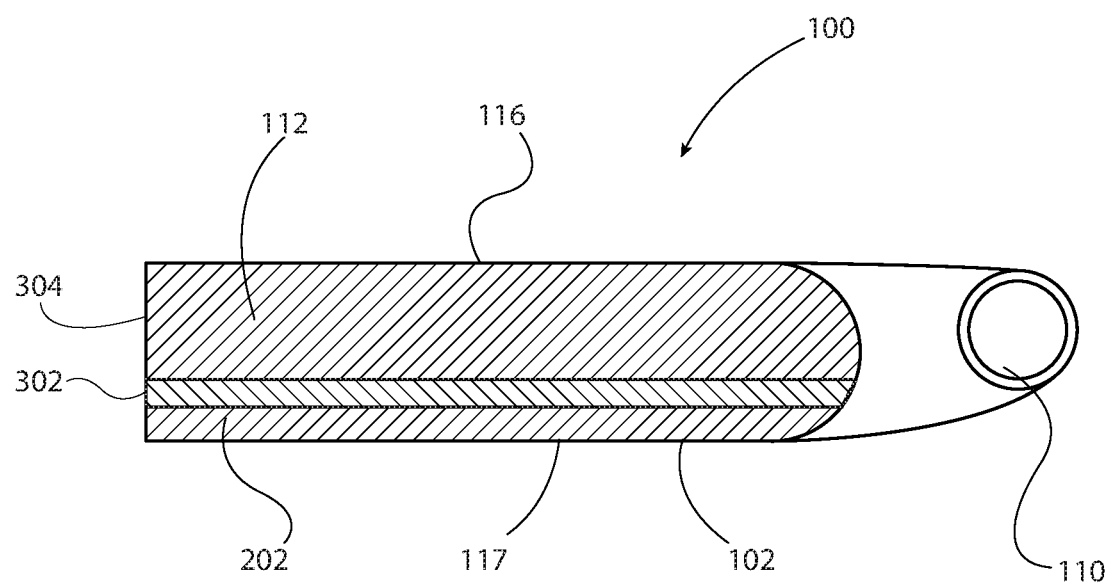
FIG. 3 is a top cross-section view of an example club head with a support layer.

Club head 100 may also include a support layer. For example, FIG. 3 illustrates a top cross-sectional view of club head 100. As depicted in FIG. 3, a support layer 302 is sandwiched between surface layer 202, and rear-portion 304 of club head 100. In the illustrated example, support layer 302 may include any suitable material. For instance, in one aspect, support layer 302 includes a metal, plastic, wood, foam, and/or ceramic materials.

In another aspect support layer 302 includes Zirconium or Zirconium with niobium and oxygen (ZR-2.5Nb). Support layer 302 may have any thickness or depth as well as height and length desired.

The density of support layer 302 may be less than or more than the density of surface layer 202.

Alternatively, support layer 302 may also constitute the remaining portion of club head 100. For example, support layer 302 may extend from a juncture of surface layer 202 to back portion 116 of club 100. That is, rear portion 304 and support layer 302 may comprise a single material with no demarcation line.

Surface layer 202 consisting of ceramic low-friction materials in conjunction with support layer 302 or other materials in a multi-component head, may be integrally formed with these other materials by any suitable means, such as forging or casting.

Alternatively, surface layer 202 and support layer 302 be joined together by adhesive bonding, welding, infrared brazing, combination of the foregoing, or other means. Other materials forming head 100 may be used with ceramic low-friction materials.

Figure 4:
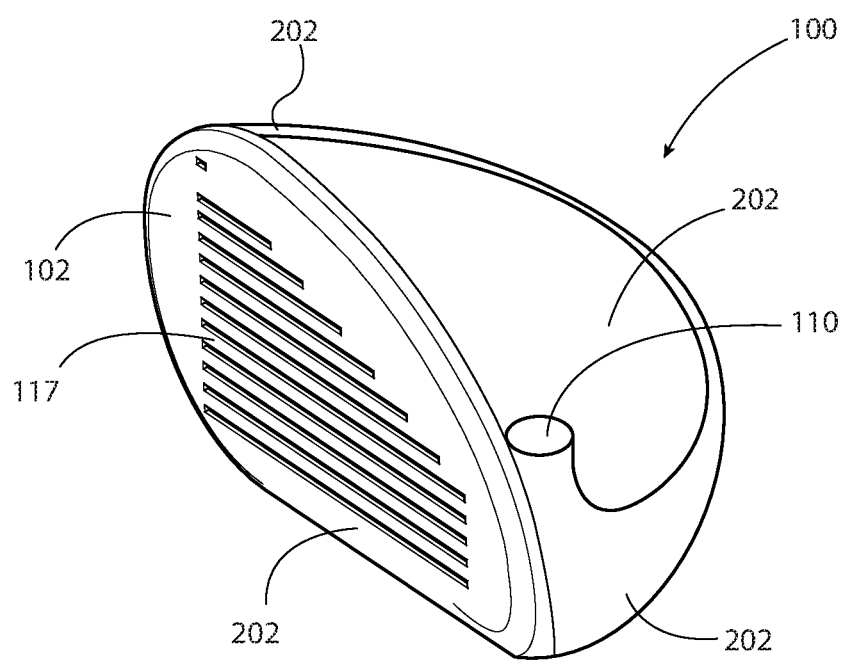
FIG. 4 is a perspective view of an example golf-club head which contains low-friction materials.

FIG. 4 shows a perspective view of another example club head 100, such as a driver head. In this example, support layer 302 (not shown in FIG. 4) forms an inner core of club head 100, and is encapsulated in surface layer 202. The interior of club head 100 beyond support layer 302, such as its core (not shown) may be hollow or any suitable solid materials including support layer 302. That is the core may include a plethora of materials such as wood, metal, or plastic, and other suitable materials for use as part of club head 100. The volume of club head 100 depicted in FIG. 4 is generally between about 200 cc and 480 cc.

In addition, weighting of club 100 as depicted in FIGS. 1-4 and dimensions of each feature of club 100 may vary.

Although some of the discussion above focuses on golf clubs and tennis rackets as the sample sports equipment, methodologies and principles described herein are not necessarily limited to golf clubs and tennis rackets, and may be applied to other sports equipment, including hockey sticks, baseball bats, lacrosse sticks, golf balls, pool sticks, and various other sports equipment.

In addition, the thickness, and weight of the low-friction materials including ceramic-zirconium oxide alloy (such as the alloy containing Niobium above) of an outer surface material may vary depending on the application. Thickness of the layer of low-friction materials as well as ceramic-zirconium oxide alloy (such as the alloy containing Niobium above) of an outer surface of an article may be varied by the amount of time these materials are exposed to heat and pressure. The process of creating low-friction materials and ceramic-zirconium oxide alloy may result in a ceramicized-metal article.

In other application, the outer surface (skin) of the wing of an airplane contains one or more of the following low-friction materials: titanium nitride, titanium carbonitride, titanium oxynitride, titanium carbide, titanium aluminum nitride, aluminum titanium nitride, titanium silicon nitride, titanium niobium nitride, titanium zirconium nitride, silicon nitride, aluminum oxide, zirconium oxide, silicon oxide, zirconium nitride, chromium nitride, chromium carbonitride, chromium aluminum nitride, aluminum chromium nitride, titanium aluminum silicon nitride, unalloyed oxidized Zirconium with Niobium, and one or more combinations of the foregoing having a thickness and configuration suitable for the aviation application.

For instance, the skin of the airplane includes any of the low-friction materials, such as Zirconium alloy materials of about 70% unalloyed Zirconium and about 30% Niobium. In another example, the skin consists of between about (95-98%) unalloyed Zirconium and about (2-5%) Niobium (Zr705).

The aforementioned low-friction materials including Oxidized Zirconium alloy compositions may be rolled to form skin plates or extruded. The inventors believe that these compositions will exhibit a combination of properties which render them suitable for use in the wing structure or fuselage of aircraft.

In another application, the outer surface of the hull of a boat or ship contains one or more of the following low-friction materials: titanium nitride, titanium carbonitride, titanium oxynitride, titanium carbide, titanium aluminum nitride, aluminum titanium nitride, titanium silicon nitride, titanium niobium nitride, titanium zirconium nitride, silicon nitride, aluminum oxide, zirconium oxide, silicon oxide, zirconium nitride, chromium nitride, chromium carbonitride, chromium aluminum nitride, aluminum chromium nitride, titanium aluminum silicon nitride, unalloyed oxidized Zirconium with Niobium, and one or more combinations of the foregoing having a thickness and configuration suitable for boating or shipping application.

The inventors believe that airplanes, vehicles, boats hulls and other applications in which the surfaces must be hardened, and exhibit reduced friction and durability will benefit from the use of these low-friction materials.

In another application, the inner most and/or outer most surface of a container for containing liquid or gas, used on trucks, trains, ships, airplanes, or other mobile or stationary containers that may contain one or more of the following low-friction materials: titanium nitride, titanium carbonitride, titanium oxynitride, titanium carbide, titanium aluminum nitride, aluminum titanium nitride, titanium silicon nitride, titanium niobium nitride, titanium zirconium nitride, silicon nitride, aluminum oxide, zirconium oxide, silicon oxide, zirconium nitride, chromium nitride, chromium carbonitride, chromium aluminum nitride, aluminum chromium nitride, titanium aluminum silicon nitride, unalloyed oxidized Zirconium with Niobium, and one or more combinations of the foregoing having a thickness and configuration suitable for such an application.

In any of the aforementioned embodiments, one skilled in the art, after having the benefit of this disclosure, may appreciate that the entire article (or multiple layers of the article) may consist of the low-friction materials. Therefore, the article may have varying thicknesses and layers of ceramicized metal or otherwise.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A golf club comprising: a head including a face portion having an outer surface comprised of a low-friction ceramic material consisting of about between 10.5-70 weight percent titanium, about between 10.5-70 weight percent aluminum, and about between 0.5-30 weight percent oxynitride.

2. A golf club comprising: a head including a face portion having an outer surface comprised of a low-friction ceramic material consisting of titanium, zirconium, and nitride, wherein the Titanium comprises about between 70-99 weight percent of the face portion, the zirconium about between 0.10-29% weight percent of the face portion, and the nitride about between 0.10%-0.29% weight percent of the face portion.

* * * * *